United States Patent [19]
Stern et al.

[11] 3,764,014
[45] Oct. 9, 1973

[54] MASS TRANSFER DEVICE

[75] Inventors: Arthur M. Stern, Morrisville; Lawrence L. Gasner, Feasterville, both of Pa.

[73] Assignee: Betz Laboratories, Inc., Trevose, Pa.

[22] Filed: Nov. 8, 1972

[21] Appl. No.: 304,689

[52] U.S. Cl. ................................ 210/220, 261/123
[51] Int. Cl. ............................................. B01f 3/04
[58] Field of Search .................. 210/195, 197, 199, 210/200, 220, 221, 256, 320; 261/123, 124

[56] References Cited
UNITED STATES PATENTS

| | | | |
|---|---|---|---|
| 3,615,078 | 10/1971 | Thayer | 210/220 X |
| 3,563,888 | 2/1971 | Klock | 210/197 X |
| 3,476,250 | 11/1969 | Fifer | 210/199 |
| 3,133,017 | 5/1964 | Lambeth | 210/220 X |
| 2,770,365 | 11/1956 | Welsch | 210/221 X |

*Primary Examiner*—Samih N. Zaharna
*Assistant Examiner*—R. H. Spitzer
*Attorney*—Alexander D. Ricci

[57] ABSTRACT

The present disclosure is directed to the effective dispersion of a gaseous medium into a liquid medium, and in particular to a device which will serve this function. The device structurally is a thin channel chamber having an inlet and an outlet, at least one baffle located so as to separate the front and back walls of the chamber and of such height as to assure that its upper edge is below the outlet with its lower edge above the floor of the chamber, and at least one gas supply means located out of the vertical plane of the baffle, the height of the chamber as measured from the floor thereof to the outlet being significantly greater than the width of the chamber as measured by the distance between the front and back wall. The device finds particular application in the reduction of Biological Oxygen Demand and Total Organic Carbon in waste water streams.

19 Claims, 8 Drawing Figures

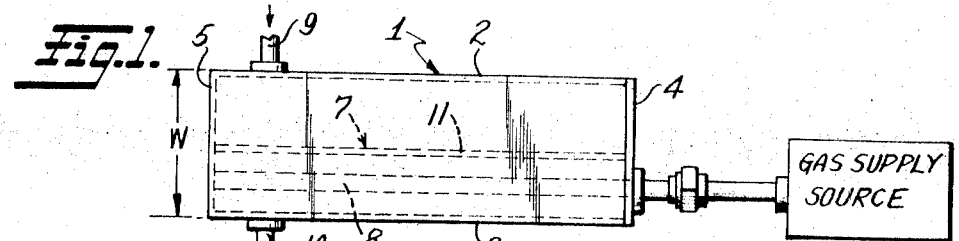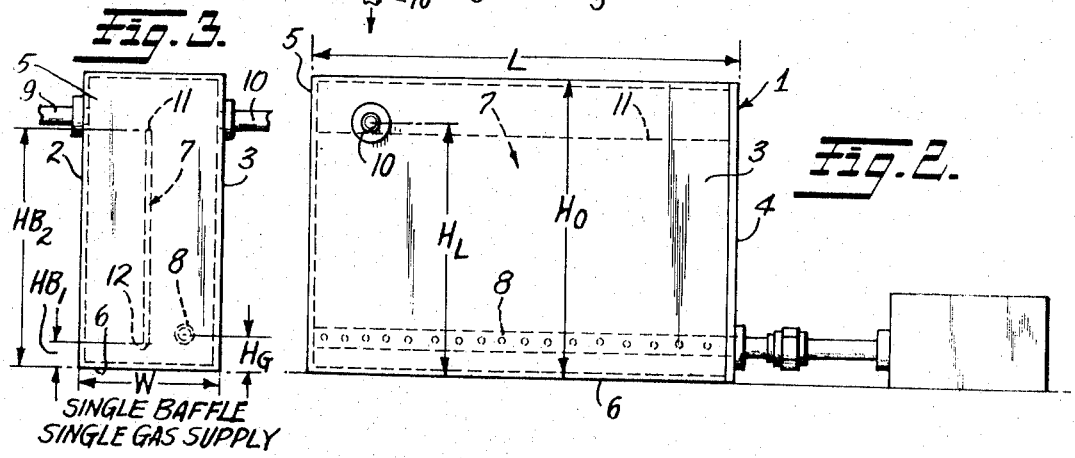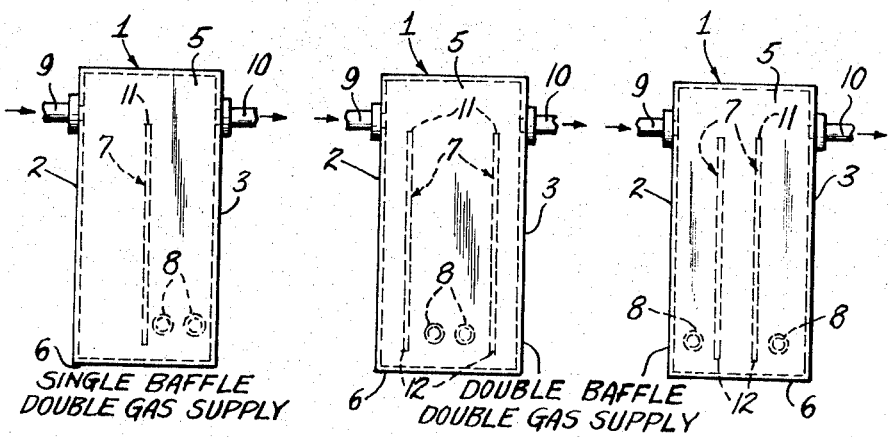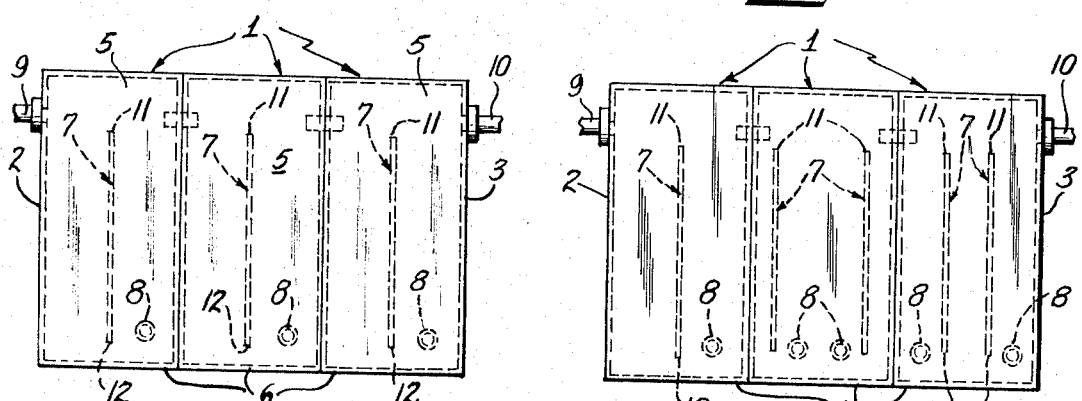

MASS TRANSFER DEVICE

BACKGROUND OF THE INVENTION

The mass transfer of a gaseous medium into a liquid, i. e. the dispersion of a gas in a liquid, is a common requirement in many diverse operations. As exemplary of these operations may be mentioned the reduction of Biological Oxygen Demand (BOD) and Total Organic Carbon (TOC) of waste water streams, e. g., sanitary and industrial, by the oxidative fermentation of the carbonaceous materials contained therein. As has been well-documented, a waste stream having a large BOD and TOC utilizes the dissolved oxygen in the water during its fermentation and decomposition, thereby depriving the marine and plant life in the particular receiving body of the needed oxygen.

Many systems and devices have been designed to reduce the BOD of waste streams. These systems and devices, however, possess various disadvantages. For example, currently used BOD reduction processes such as chemical-physical adsorption and precipitation processes have high chemical costs. Activated carbon adsorption processes require high capital costs and high costs for carbon regeneration and trickling filter and activated sludge processes (biological) require large land areas for waste stabilization.

The high costs derived because of relatively long residence time required for waste stabilization results in a need for large land areas and costly equipment. The invention to be described is designed to provide greater versatility at reduced capital and land costs and with fewer maintenance problems and costs associated therewith.

However, although the device of the present system is effective for stabilization of waste effluent, it is not its only use. The device has utility in any situation where intimate contact, and especially large surface area contact, between a liquid and gaseous medium is a necessity. The systems and devices which are currently in use for this purpose are complex and complicated.

Representative of processes where a device under the present invention can be utilized may be described as any process or system wherein the scrubbing or adsorption of a gaseous phase in a liquid phase is a requirement.

More specifically, the device may be used in:
1. The scrubbing or adsorption of light fraction hydrocarbons from stock waste streams in petroleum refineries by hot recirculating oil streams;
2. Adsorption devices used in processes such as:
   a. Catalytic reforming
   b. HDS processing for upgrading high sulfur residual fuel oils into low sulfur fuels or "cat cracker charge"
   c. H-oil process for converting heavy residue asphaltic materials into lighter fractions
   d. Hydrotreating
   e. Extraction processes for the removal of phenols from raw lubricating oils
   f. Steam reformation for producing high purity hydrogen
   g. Partial oxidation process for manufacturing hydrogen
   h. Carbonation of liquids
   i. Chlorination of liquids
   j. Acetylene manufacture
   k. Acrylonitrile manufacture
   l. Acrylic ester manufacture
   m. Ammonia manufacture
   n. Ethylene oxide and glycol manufacture
   o. Formaldehyde manufacture
3. Fermentation processes such as:
   a. Oxidative fermentation of organic materials to produce antibiotics, acids such as fumaric, single cell proteins, etc.
   b. Production of alcohol, i. e., beverages, e. g., wines, liquors and whiskey
4. Waste water treatment
   a. Reduction of BOD and TOC by the promotion of aerobic microbial growth which consumes organic matter.

Accordingly, it is evident that the device of the present invention possesses widespread applicability.

In view of the great need for more efficient mass transfer means, it was the present inventors' goal to design a device which could be inexpensively constructed, operated and maintained and one which was efficient and economic from a space standpoint.

Devices and systems have been designed and utilized for the purpose of mass transfer, i. e., the dispersion of a gaseous phase in a liquid, for many years, and descriptions of these devices, systems and units may be found in any of the following U. S. Pat. Nos.:

| | |
|---|---|
| 642,460 | 3,216,573 |
| 1,076,666 | 3,234,123 |
| 1,253,653 | 3,385,444 |
| 2,458,163 | 3,468,057 |
| 2,718,275 | 3,476,250 |
| 2,770,365 | 3,529,725 |
| 3,133,130 | 3,563,888 |
| 3,161,590 | 3,615,078 |
| 3,168,465 | |

However, in spite of the work which has been done in this area, it was felt that none of the technology disclosed in these patents provided for a device which would not only permit effective mass transfer, but also one which could:

1. Be constructed preferably in modular design so as to allow units to be added as needed without interruption of operations;
2. Be transported or moved as a unit;
3. Alternately can be constructed on-site utilizing existing lagoons or basins;
4. Be constructed inexpensively and simply;
5. Require few moving parts;
6. Require little, if any, maintenance;
7. Require little power (or expense) in terms of the mass transfer efficiency; and
8. Provide impressive spatial economics.

The last feature is of utmost importance, particularly with respect to waste effluent treatment. This is due to the fact that land is a valuable asset in most geographical areas of the country and accordingly the building of vast holding lagoons or basins has become very impractical. Moreover, many existing industrial sites no longer have available space to provide treatment areas for wastes. In these instances, the industries affected have had to utilize, if possible, industrial and municipal waste treatment systems and therefore were obligated to pay for the treatment of their respective wastes. The payments or taxes charged for this service were expensive and commonly were made on the basis of the volume and contents of the waste, the difficulty of removing the non-dischargeable constituents, the Biological Oxygen Demand and the Total Organic Carbon content of the waste. Accordingly, it was apparent to the inventors that if a device could provide effective on-site BOD reduction of a waste, at minimum cost of construction and operation and with little land or plant site usage, substantial savings would be derived. The present inventors' device in fact provides these advantages and accordingly fills the gap apparent in the prior art technology.

GENERAL DESCRIPTION OF THE INVENTION

Since the device of the present invention is quite effective in providing a substantial reduction in BOD and TOC of waste streams, the invention will be described in detail using this application.

The gas in this situation is air while the waste source is an aqueous stream containing organic contaminants.

Aeration (mass transfer of air into liquid) occurs to some extent whenever air comes into contact with water regardless of the geometry of the vessel in which the reaction takes place. Wind flowing across a lake or air pumped into a water tank results in a certain amount of the gas phase dissolving into the liquid phase. In most cases this aeration is not optimized with respect to cost and mass transfer rate. Cost in terms of horse power hours per pound of oxygen transferred is at its minimum in large lagoons or lakes where the only aeration taking place is that induced by wind blowing across surfaces. In order to increase the rate of mass transfer, power is added in the form of agitators, sprayers, spargers or combinations thereof. In each case, as the power cost per unit of water is increased, the mass transfer rate increases. The functional relationship of horse power and mass transfer rates differs for the particular method employed. In other words, where one technique may be optimum at low oxygen transfer rates another method may be more economical at higher oxygen transfer rates. Therefore, it is necessary to specify the range of oxygen transfer desired and to optimize the cost per unit oxygen transferred within that range. In the case of the present invention (thin channel airlift mass transfer device), the goal is to achieve mass transfer rates from 1 to 200 millimoles of diatomic oxygen per liter of water per hour. The achievement then is that, within this particular range, the cost of aeration is less per total effluent volume treated when using the present system than would be the case when utilizing conventional or known systems. Indeed, it is likely that the upper levels of this range cannot be achieved at all with the systems referred to in the patents reviewed.

The device which permits these ranges of mass transfer to be attained is described as a thin channel chamber designed to receive, contain and discharge a liquid. The chamber is structured with a forward wall disposed opposite a back wall and having side walls and a floor which respectively contact and separate the forward and back walls. The chamber is also provided with:
i. an inlet means for providing liquid to the chamber;
ii. an outlet means for providing for the discharge of the liquid and which establishes a normal liquid level in the chamber;
iii. at least one substantially solid baffle disposed so as to separate and extend substantially parallel with at least one of the front and back walls and contacting the side walls; the upper edge of the baffle being below said normal liquid level and the lower edge of the baffle being positioned so as to be located at some height above the floor level; and
iv. at least one means for providing gas to the chamber and which means extends substantially the length of the chamber and is located out of the vertical plane of the baffle and on the side of the baffle which is furthest from the inlet means and at a position ranging from a height of one-half the distance of the lower edge of the baffle from the floor of the chamber to a height equal to about twice the distance of the lower edge of the baffle from the floor of the chamber.

FIGS. 1 through 8 of the Drawing illustrate the basic structural concept as set forth above and, in addition, illustrate various modifications which can be utilized where desirable.

FIG. 1 is a diagrammatic plane view of the device in its simplest form.

FIG. 2 is an elevational view of the chamber of FIG. 1.

FIG. 3 is a side elevational view of the chamber as viewed from the left of FIG. 1.

FIG. 3 is a side elevational view of the chamber as viewed from the left of FIG. 1.

FIGS. 4, 5 and 6 are end elevational views similar to FIG. 3 showing various other arrangements of the baffles and gas supply means.

FIG. 7 is a side elevational view of a group of chambers arranged in series.

FIG. 8 is a side elevational view of a group of chambers arranged in series where the individual chambers have either single or multiple baffles and gas supply means arranged in locations different from the remaining chambers.

Referring to FIGS. 1 and 3, chamber 1 is composed structurally of integrally secured front wall 2 and back wall 3 separated and connected by floor 6 and side walls 4 and 5. Since the chamber will hold liquid, it should be a water-tight structure.

Extending through chamber 1 and parallel with front wall 2 and/or back wall 3 and connected to and supported by side walls 4 and 5 is baffle 7. Gas supply means 8 which is located out of the vertical plane of baffle 7 and on the side of baffle 7 which is opposite inlet 9 is positioned anywhere from a height of one-half the distance of the lower edge of the baffle from the floor 6 to a height equal to twice the distance of the lower edge 12 of the baffle from the floor of the chamber.

Gas supply means (sparger) 8 extends through side wall 4 and to a gas supply source (illustrated in FIGS. 1 and 2) such as a diaphragm or centrifugal compressor.

Inlet 9 may be effectively situated in any number of locations but should be placed so as to provide a downward flow of the liquid entering chamber 1 to insure that the liquid does not bypass baffle 7 and directly exit. For the same reason, the inlet should be located as far as effectively possible from outlet 10.

Outlet 10 which provides for the discharge of the liquid can also function as an outlet for escaping gas in the event the chamber is provided with a cover (not illustrated in Figures) which may or may not have a gas escape means.

Since the effectiveness of the subject device is dependent upon the geometrical relationship between the structural features of the chamber and the location of the baffle and gas supply means, FIGS. 1, 2 and 3 bear not only the numerical legends, but also bear dimensional legends which represent the dimensions of the various structural parts and the location of ancillary and internal parts.

The dimensional legends are as follows:

$H_O$ represents the overall height of the chamber walls 2, 3, 4 and 5

$H_L$ represents the height of the liquid outlet 10

$H_{B1}$ represents the height of the lower edge 12 of the baffle from floor 6

$H_{B2}$ represents the height of the upper edge 11 of the baffle from floor 6

$H_G$ represents the height of the gas supply means from floor 6

L represents the length of the chamber

W represents the width of the chamber

The geometrical relationship between the structural features may be described as follows:

1. A most important characteristic of the invention is that the height of liquid outlet ($H_L$) must be significantly greater than the chamber width, i. e., $$[H_L > W],$$

$H_L$ may range from about 2 to about 20 times as great as W with a typical value being about 5.

2. The overall chamber height ($H_O$) is greater than the height of the liquid outlet ($H_L$), i. e., $$[H_O > H_L]$$

3. The height of the liquid outlet 10 ($H_L$) is greater than the height of the upper edge of baffle 11 ($H_{B2}$), i. e., $$[H_L > H_{B2}]$$

This relationship is quite flexible in that for low liquid outlet height/chamber width ratios, the liquid outlet height will be less than twice the height of the baffle top ($H_{B2}$). When the liquid outlet height to chamber width ratio is high, $H_L$ may be up to 10 times as great as $H_{B2}$.

4. The operating characteristics of the unit are independent of the length, L. Therefore, the length of the chamber may be chosen based upon convenience.

5. It is desirable in order to provide most effective mass transfer to have a gas supply means which extends the length of the chamber to insure gasification of the entire volume.

6. The bottom edge of the baffle 12 is preferably located at some height ($H_{B1}$) slightly above floor level to provide for the passage of liquid from one side of the baffle to the other. However, it would appear to be undesirable to have $H_{B1}$ larger than 1.5W, i. e., $$[H_{B1} \text{ is } > \text{floor level to } 1.5W].$$

7. At least one of the gas supply means 8 is located out of the vertical plane of the baffle and on the side of the baffle which is furthest from the inlet means. The height of the gas supply means in the chamber ($H_G$) from floor level should range from floor level to a distance equal to about twice the distance of the lower edge of the baffle $H_{B1}$ from the floor, i. e., $$[H_G = \tfrac{1}{2} H_{B1} \text{ to } 2 H_{B1}].$$

The chamber may possess multiple gas supply means in combination with single or multiple baffles as illustrated by the drawings. Although flexibility of design is great, the parameters set forth above for at least one baffle and one gas supply means are necessary to obtain efficient mass transfer.

The individual chambers preferably should be designed and constructed so as to provide supporting elements for additional baffles and gas supply means in the wall as the need arises. Likewise, the side wall should perhaps be designed to permit the provision of additional gas supply means if necessary.

In the event that large volumes of liquid are to be handled and the residence time of the liquid is to be increased to insure effective mass transfer, the chambers, because they are modular in nature, can be arranged in series as depicted in FIG. 7 of the Drawing. In this arrangement, the outlet is commensurate with the inlet in the receiving chamber. Although FIG. 7 illustrates a symmetrical design, the individual chambers may differ with respect to baffle and gas supply means design.

In the event that a series of chambers is required, then the system may be fabricated inexpensively since the back wall of the first chamber will function as the forward wall of the following chamber thereby establishing a common wall.

A major objective of the aerator design is to maximize agitation of the liquid and impingement of the gas bubbles. This in turn provides for greater shear of the air bubbles and greater mass transfer and in the case of wastes, better contact with dispersed solids. The greater contact of surfaces will provide greater microbial growth with a concomitant consumption of organic matter.

Preferably, the chamber should be rectangular to insure adequate impingement surfaces. However, this may not always be possible when the chambers are constructed on-site utilizing lagoons or basins. These, of course, may or may not be rectangular; however, even in these instances, it is necessary to fulfill at least partially the dimensional prerequisites if adequate aeration, for example is to be accomplished. This is particularly true of the relationship of height of outlet to width.

It has been ascertained that in most instances effective mass transfer can be accomplished where the liquid after entering the chamber is directed on a downward flow. If the baffle is in the preferred position, i.e., located midway between the front and back walls with its lower edge being approximately one chamber width from the floor of the chamber, and if the gas supply means is located near the side of the baffle which is farthest from the down flowing liquid, a current is created which assures excellent impingement of gas bubbles. The gas bubbles are accordingly sheared creating greater surface area and greater contact of the gas with the liquid. This arrangement also avoids any bypass of the entering liquid to the outlet.

The air flow rates which can be used successfully are quite flexible and depend upon the objective to be achieved. Gas flow rates (cm/sec.) can be calculated by dividing the volumetric gas flow in cubic centimeters per second by the cross-sectional area of the chamber in centimeters squared. Flow rates of 0.1 cm/sec. to 400 cm/sec. and particularly from about 2 cm/sec. to about 20 cm/sec. have been used quite successfully.

In the reduction of BOD, for example, the air flow rate can be made to vary depending upon the BOD level of the waste. If BOD is low, a low air flow rate may be utilized. If the BOD is high, then commensurate higher air flow rates will be utilized.

The size of the various chambers may be a direct function of the gas flow rate necessary. The optimum height generally will be that height which will provide the maximum static pressure head which will still allow the use of a single stage centrifugal compressor. Greater heights which result in higher static pressure heads would require expensive multiple stage compressors. This, in turn, would require expensive intermediate cooling of the compressed air. In general, it is advantageous to increase the liquid depth only up to the point where more expensive compressor systems are required.

The structural parts of the chamber may be produced from any structural material, such as wood, plastic, concrete, metal sheets, fiberglass or metal reinforced plastic sheets. Plastic may be polyvinylchloride, saturated or unsaturated polyester, epoxy, hardened or strengthened synthetic rubber, polymethyl methacrylate, polycarbonate or other suitably strong, enduring and inexpensive material. The same is true of the baffle and the air sparger, the latter of which can be constructed of polycarbonate, polyvinylchloride or other suitable material.

Since there is constant liquid and air contact, particularly in waste water treatment, the propensity for corrosion is great. The use of plastic materials can alleviate the problem. Similarly, the air sparger preferably is a tube of plastic material, the end of which that is in the chamber, is plugged and attached to the side wall. The tube merely has holes in it to release air or the gas to the liquid or may consist of porous elements to accomplish the same result.

GEOMETRICAL OPTIMIZATION OF A BENCH SCALE THIN CHANNEL RECTANGULAR MASS TRANSFER DEVICE

A special bench top style mass transfer device as illustrated in FIGS. 1, 2 and 3 measuring 8 inches (W) × 12 inches (L) × 25 inches (H) was constructed for these experiments. The ends were grooved every inch so that a total partition could be installed making the chamber width variable from 1 to 8 inches. Several different baffles could be installed in any desired groove by placing a spacer in the groove to raise a partial partition off of the chamber floor. Baffle height was varied by adding short extensions to the baffle. Baffle position was changed by using various length spacers. One or two spargers made of ⅜ inch tubing with 1/16 inch holes spaced at half inch intervals were installed. Gas flow rates were monitored with a rotameter.

Three sets of experiments were carried out. The data from each will be presented separately. In the first set of experiments (Table 1A through C), a 4 inch chamber (except for A) was used. Standard conditions for the sake of comparisons were 40 l/min. air flow, 15 l liquid volume, 14 inches baffle spaced 2 inches from the floor. In the experiments depicted in Table 2A, the chamber width was varied to 2, 4 and 8 inches. For the remainder of the experiments, an 8 inch chamber was used with a 14 inches baffle, 80 l/min. air flow rate and a 2 inches baffle spacing.

The method used for determining oxygen transfer rates was the sulfite method. Concentrated sodium sulfite with traces of copper and cobalt ions was added to the unit to a concentration of about 0.1 N. The air sparging rate was turned up to maximum at zero minutes. Samples were taken at 1, 4, 7 and 10 minutes when low mass transfer rates were anticipated, or at 1, 3, 5 and 7 minutes when high mass transfer rates were expected. The samples were titrated with standardized potassium iodide - iodate solution. Residual sulfite was calculated and the slope, which is proportioned to the rate of oxygen sulfite reaction, was determined by a least squares analysis of the four data points. From this, a mass transfer coefficient was calculated.

RESULTS AND DISCUSSION

1A Mass Transfer Coefficient versus Chamber Width — Table 1A

Conditions

Chamber width was fixed at 2 inches, 4 inches and 8 inches; correspondingly, liquid volumes were 7.5, 15 and 30 liters. The baffle was placed equidistant from the wall and the baffle.

Conclusions

At constant gas flow rate, the volumetric mass transfer coefficient decreased as the liquid volume, cross-sectional area, and chamber width were increased. This change in mass transfer coefficient appeared to be roughly inversely proportional to these variables.

1B Mass Transfer Coefficient versus Gas Flow Rate — Table 1B

Conditions

Gas flow rates were fixed at 20, 40, 60 and 80 l/min.

Conclusions

The mass transfer coefficient increased approximately linearly with gas flow rate.

1C Mass Transfer Coefficient versus Superficial Gas Velocity — Table 1C

This data was derived from calculations using the data of Table 1A and Table 1B where the gas flow rate divided by the total cross-sectional area represents the superficial gas velocity. The mass transfer coefficient increased directly with the superficial gas velocity. The agreement between the data of Tables 1A and 1B is quite good indicating superficial gas velocity as a more general, more valid, and therefore, more useful variable. The equation representing this is:

$$K_L A = 12 V_s$$

Where $K_L A$ is the mass transfer coefficient in mmoles per liter hour, and $V_s$ is the superficial gas velocity in cm per second.

TABLE 1

| | Variables | Extent | Av. Mass Transfer Coefficient (m moles/1-hr) |
|---|---|---|---|
| 1A | Chamber width (inches) at fixed gas flow | 2 | 53.5 |
| | | 4 | 25.0 |
| | | 8 | 10.0 |
| 1B | Gas flow (1/min.) at fixed chamber width | 20 | 17.5 |
| | | 40 | 25.0 |
| | | 60 | 34.5 |
| | | 80 | 53.5 |
| 1C | Superficial Gas Velocity (cm/sec.) | 1.1 | 12.6 |
| | | 2.3 | 25.0 |
| | | 3.4 | 34.5 |
| | | 4.5 | 52.5 |

1D Baffle Position versus Mass Transfer Coefficient

Additional testing was conducted to ascertain the effect of baffle position. The particulars and conclusions drawn therefrom are as follows:

Experimental Conditions

The height of the baffle bottom from the chamber floor was varied to 1, 2 and 3 inches in a 4 inch chamber. Air flow = 40 l/min.; liquid vol. = 15 liters; baffle height was 14 inches.

Conclusions

The mass transfer coefficient decreased as the baffle distance from the floor is increased. Raising the baffle bottom height from the floor decreased the resistance to liquid flow, and therefore increased the liquid velocity. From the data collected it appears that the mass transfer coefficient decreased with an increase in liquid circulation velocity.

2A Gas Flow Rate versus Mass Transfer Coefficient — Table 2A

Conditions

The gas flow rate was varied up to 80 l/min. with three chamber sizes: 2 inches, 4 inches and 8 inches. A single baffle was placed 4 inches from each wall with a single aerator placed 2 inches from one wall at floor level.

Conclusions

The mass transfer coefficient increased linearly with gas flow rate. The data for a 4 inches chamber agreed with the data recorded in Table 1B. It is concluded that the mass transfer rate increased linearly with gas flow rate under the conditions studied.

TABLE 2A

| Variables | | Ave. Mass Transfer Coefficient (m moles/l-hr) |
|---|---|---|
| Chamber Width (inches) | Gas Flow Rate (l/min.) | |
| 2 | 10 | 12.7 |
|  | 20 | 31.3 |
|  | 30 | 34.0 |
|  | 40 | 70 |
|  | 60 | N.D.* |
|  | 80 | N.D. |
| 4 | 10 | N.D. |
|  | 20 | 12.0 |
|  | 30 | N.D. |
|  | 40 | 26.0 |
|  | 60 | 49.6 |
|  | 80 | 68.7 |
| 8 | 10 | N.D. |
|  | 20 | 4.0 |
|  | 30 | N.D. |
|  | 40 | 10.3 |
|  | 60 | 19.6 |
|  | 80 | 28.7 |

* N.D. — Not Determined

3A Height of Sparger from Floor with No Baffle — Table 3A

Conditions

The height of the sparger was varied from 0 to 16 inches. The chamber was 8 inches wide and the sparger was located approximately 4 inches from each wall.

Conclusions

There is virtually a straight line decrease in mass transfer coefficient with height of the sparger. At zero height the mass transfer rate was maximum and was comparable to that achieved with the presence of a baffle. However this comparison is only valid for very shallow vessels since as the height of the overall vessel is increased to values greater than 2, (i.e., 2W) the advantages of the presence of a baffle become more apparent.

3B Height of Sparger from Floor in a One Baffle System — Table 3B

Conditions

A single baffle was centrally located in an eight inch chamber. The single aerator was located 2 inches from one wall at various heights from the floor of the chamber.

Conclusions

It was observed that, as the sparger approached the level of the baffle bottom (which is 2 inches), the mass transfer coefficient increased significantly. As the sparger was raised further, the mass transfer coefficient decreased. It is concluded that in the case of a single baffle and a single aerator, the aerator should be located within a factor of one half to two of the baffle bottom height from the floor of the chamber. In no case should it be located significantly above the height of the baffle bottom.

3C, 3D & 3E Multiple Baffles — Table 3C, 3D & 3E

Conditions

In each of several experiments, two baffles were positioned in an 8 inch chamber such that each baffle was 2 inches from the wall. This would allow equal upflow and downflow areas for gas-liquid two phase flow. Three sets of experiments were carried out: (1) two aerators, each one inch from the two chamber walls, (2) two aerators, each three inches from the two chamber walls, and (3) one aerator, 4 inches from each of the chamber walls. Sparger heights were varied at zero, 9 and 16 inches. No experiments were carried out at a 2 inch height although a maximum would be expected there from the results of Table 3A.

Conclusions

In all cases, the behavior was similar in that substantial reduction in the mass transfer coefficient occurred as the sparger height was increased. There appeared to be a slight benefit in operating with two baffles and two aerators when the aerators were located close to the walls of the chamber as opposed to their being located near the center of the chamber. There appeared to be little difference between one or two aerators if they are located near the center of the chamber. It is concluded that, for the case of multiple baffles and multiple or single aerators, location of the aerators near the chamber floor is significantly more effective than locating them near the liquid surface. It was generalized from the results recorded in Tables 3B through 3E that location of the aerators should be at the height of the lower edge of the baffle for optimum performance.

TABLE 3

| | Aerators | | | |
|---|---|---|---|---|
| | No. of baffles | No. | Horizontal location | Vertical location as measured from chamber floor (Inches) | Average mass transfer coefficient (mmoles/l-hr.) |
| 3A | 0 | 1 | Middle of chamber | 0 | 34 |
| | | | | 6.5 | 20.2 |
| | | | | 16.0 | 8.8 |
| 3B | 1 | 1 | Out of vertical plane of baffle. | 0 | 28.2 |
| | | | | 1.0 | 39 |
| | | | | 2.0 | 40 |
| | | | | 4.0 | 34 |
| | | | | 9.0 | 16.2 |
| | | | | 16.0 | 5.5 |
| 3C | 2 | 1 | Between both baffles. | 0 | 30 |
| | | | | 9.0 | 22.5 |
| | | | | 16.0 | 19.2 |
| 3D | 2 | 2 | Between baffles and chamber walls. | 0 | 35 |
| | | | | 9.0 | 24.5 |
| | | | | 16.0 | 19 |
| 3E | 2 | 2 | Between the two baffles. | 0 | 31.5 |
| | | | | 9.0 | 28 |
| | | | | 16.0 | 14.5 |

In order to test the concept over a long term period, a single rectangular chamber was constructed of three-eighths inch plexiglas whose overall dimensions were 8 inches wide × 11½ long × 48 inches high. This chamber was equipped with a baffle located equidistant from the front and back walls with its lower edge 1 chamber width from the floor, a sparger located off the vertical plane of the baffle and in proximity to the lower edge of the baffle which was furthest from the inlet, an inlet and an overflow outlet (Note, FIGS. 1, 2 and 3). Eighty liters per minute air flow was used in these experiments. The chamber was connected to a settling chamber of about the same dimensions. A variable speed pump was connected from the bottom of the settling chamber to a sludge return port in the aeration chamber. The feed was a synthetic mixture of nutrient broth, glucose, potassium phosphate, and sodium benzoate. Since catabolite repression was noted in the first experiment, the sodium benzoate was replaced by additional glucose in the second experiment. The nutrient mixture was made up of a concentrate of 108 grams of each of the above plus trace minerals in 18 liters of tap water. It was fed into the chamber through a dual head pump with the other head supplying about a 10-fold flow of tap water as a feed diluent. Feed samples were taken upstream of a mixing T. The feed rate was varied by changing the pump speed. The ratio of the vessel volume to the feed rate is the residence time. Samples were taken of the feed stream, the recycle stream, and the outlet stream; BOD, TOC, and suspended solids were measured. Samples were centrifuged before BOD and TOC measurements were made since the high levels of viable solids required for the process, masked the effectiveness of reductions in these parameters. BOD and TOC measurements were performed by standard techniques.

RESULTS AND DISCUSSION

The results are summarized in Tables 4 and 5 for Runs 1 and 2. It should be pointed out that Run 1 lasted 5 weeks and Run 2 lasted nine weeks. Much of this time was spent modifying the unit for better performance and, also, testing for long term operational stability.

Run 1

The first data point in Table 4 shows a disappointingly small decrease in BOD across the unit. The residual BOD in the outlet stream was found to be almost entirely due to the basal respiration of the contained microorganisms. This effect is indicated by the second data point where the outlet sample was centrifuged and filtered before the BOD test was run. Instead of a residual BOD of 800 ppm, a BOD of 13 ppm was found which represents a 99.1 percent decrease in the aeration chamber as compared to a 33.3 percent decrease noted before removal of microorganisms. In all further experiments the samples were centrifuged and filtered before the BOD test was run. It should be noted that the high rate process which characterizes the present system relies upon a high active biomass loading of the aerator and if this biomass were to contribute to the outlet BOD the major advantage of the process may be overlooked as shown by the above data. Moreover, in a fully operational plant, most of the biomass would be removed from the final effluent which would result in a plant effluent similar to that derived by centrifugation in the laboratory studies described.

In Run 1, the residence time was decreased in stages over a 2 week interval from eighteen hours to about 2 hours. The unit performed quite well at all residence times down to, and including, 5 hours. At the lower residence times, multiple samples were taken several hours apart. The results obtained are shown separately for the two samples to give some idea of the variability of the data.

The biological oxygen consumption rate is calculated as the BOD reduced per liter of reactor volume per hour and is a measure of the mass transfer rate of oxygen that was required to keep the unit operating under the experimental conditions. It is seen in Table 4 that, in no case, did this exceed 10 mmoles $O_2$/l-hr. Therefore, the experimental unit was not taxed to its maximum range of effectiveness.

The data for 2.39 hour residence time show roughly a 50 percent reduction in BOD and TOC. This was interpreted as possible catabolite repression in which glucose was completely oxidized at the expense of sodium benzoate oxidation. Therefore, in subsequent work sodium benzoate was left out of the medium and was replaced by additional glucose.

Run 2

Table 5 is a summary of results from the second experimental trial. In this case, the culture was allowed to develop from an activated sludge inoculum for about 9 days before samples were taken. In these experiments the residence time was varied from about 5.5 hours down to about 0.6 hours.

The BOD values obtained from the inlet pump showed considerable variation from sample to sample. It is believed that this was largely due to inconsistencies in the BOD test. For example, the BOD value of 527 ppm was calculated from three dilutions, as the average of 500 ppm, 720 ppm and 360 ppm. The BOD value of 845 ppm was calculated as the average of 700 ppm and 990 ppm. From this example it is apparent that no significant difference exists between BOD values of 845 ppm and 527 ppm. This conclusion is supported by the TOC results where the corresponding values are 881 ppm and 910 ppm respectively. Two BOD values are not significantly different if one is 60 percent higher than another if replicate values have standard deviations of 25 percent and 40 percent. This is a clear example of the fact that BOD values must be interpreted with care.

It is concluded that the experimental results show BOD removals of 95 percent or greater for residence times down to 1.58 hours and, 85 percent for a residence time of 0.61 hours. A BOD removal of 85 percent in a single stage unit translates into a removal of 95 percent or better in a two or three stage unit. This is due to the relatively high level of bypassing without reaction that occurs in a single stage well mixed reactor.

It should be pointed out that the biological oxygen consumption rate for the 0.61 hour test was about 30 mmols $O_2$/l$_{hr}$. This is approaching the range where the thin channel device is most efficient. It is concluded from the data that this unit, at 100 mmoles/l-hr., could handle either three times the BOD or three times the volume of waste water at the same BOD loading. The present experiment was not expanded to include residence times below 0.61 hours; however, it is believed that under the proper conditions effective BOD and TOC reduction could be obtained well below this level.

Run 2 was operated for a total of nine weeks to test for long term stability. It remained stable when the throughput rates remained relatively high.

TABLE 4.—SUMMARY OF RESULTS OF RUN 1

| Day | Residence time (hours) | Inlet BOD (p.p.m.) | Outlet BOD (p.p.m.) | BOD removal (percent) | Biological oxygen consumption rate (mmole O₂/l hour) | Suspended solids (mg./ml.) | Inlet TOC (p.p.m.) | Outlet TOC (p.p.m.) | TOC removal (percent) |
|---|---|---|---|---|---|---|---|---|---|
| 9th | 17.86 | 1,200 | 800 | 33.3 | 0.05 | | | | |
| 15th | 17.93 | 1,397 | 13 | 99.1 | 2.4 | | | | |
| 16th | 19.44 | 520 | 18 | 97.1 | 0.81 | | | | |
| 19th | 9.99 | 1,327 | 13 | 99.0 | 4.1 | 1.59 | 626 | 41 | 93.5 |
| 20th | 8.11 | 1,075 | 13 | 98.8 | 4.1 | 1.59 | 618 | 37 | 94.0 |
| | | 1,145 | 11 | 99.0 | 4.4 | 1.68 | 598 | 37 | 93.8 |
| 21st | 5.22 | 1,175 | 22 | 98.1 | 6.9 | 1.86 | 588 | 44 | 92.5 |
| | | 1,637 | 111 | 93.2 | 9.1 | 2.08 | 1,048 | 103 | 90.2 |
| 22nd | 4.93 | 1,115 | 175 | 84.3 | 6.0 | 1.76 | 717 | 195 | 72.8 |
| | | 1,185 | 58 | 95.1 | 7.1 | 1.54 | 657 | 69 | 89.5 |
| 23rd | 2.39 | 1,140 | 570 | 50.0 | 7.5 | 1.37 | 687 | 384 | 43.8 |
| | | 1,147 | 870 | 24.0 | 3.6 | 0.011 | 697 | 385 | 44.7 |

TABLE 5.—SUMMARY OF RESULTS OF RUN 2

| Day | Residence time (hours) | Inlet BOD (p.p.m.) | Outlet BOD (p.p.m.) | BOD removal (percent) | Biological oxygen consumption rate (mmole O₂/l hour) | Suspended solids (mg./ml.) | Inlet TOC (p.p.m.) | Outlet TOC (p.p.m.) | TOC removal (percent) |
|---|---|---|---|---|---|---|---|---|---|
| 9th | 5.37 | 1,055 | 35 | 96.7 | 6.0 | 2.61 | 915 | 115 | 87.4 |
| 12th | 5.48 | 880 | 18 | 98.0 | 5.0 | 5.52 | 864 | 66 | 92.4 |
| 13th | 2.63 | 710 | 125 | 82.4 | 7.0 | 6.77 | 800 | 137 | 82.9 |
| | | 815 | 34 | 95.8 | 9.3 | 7.10 | 823 | 82 | 90.0 |
| 14th | 2.49 | 535 | 150 | 72.0 | 4.9 | 7.55 | 655 | 197 | 70.0 |
| | | 575 | 33 | 92.3 | 6.7 | 7.84 | 675 | 65 | 90.4 |
| 15th | 1.58 | 870 | 25 | 98.1 | 17.0 | 10.21 | 763 | 60 | 92.1 |
| | | 715 | 36 | 95.0 | 13.5 | 10.27 | 744 | 69 | 90.8 |
| 16th | 0.61 | 845 | 107 | 87.3 | 37.8 | 10.56 | 881 | 182 | 79.4 |
| | | 527 | 106 | 79.9 | 21.6 | 10.67 | 910 | 132 | 85.5 |

From the foregoing then, it is apparent that the device of the invention does in fact provide the mass transfer efficiencies claimed and required in various reaction and adsorption processes.

Having thus described the invention, what we claim is:

1. A mass transfer device comprising a thin channel member designed to receive, contain and discharge liquid, and having a forward wall disposed opposite a back wall, side walls and a floor which respectively contact and separate the forward and back walls, said chamber being provided with:
   i. an inlet means for providing liquid to the chamber;
   ii. an outlet means for providing for the discharge of the liquid and which establishes a normal liquid level in the chamber;
   iii. at least one substantially solid baffle disposed so as to separate and extend substantially parallel with at least one of the front and back walls, and contacting the side walls, the upper edge of the baffle being below said normal liquid level and the lower edge of the baffle being positioned so as to be located at some height above the floor level; and
   iv. at least one means for providing gas to the chamber and which means extends substantially the length of the chamber and is located out of the vertical plane of the baffle and on the side of the baffle which is farthest from the inlet means and at a position ranging from a height of one-half the distance of the lower edge of the baffle from the floor of the chamber to a height of about twice the distance of the lower edge of the baffle from the floor of the chamber;

the chamber further characterized in that the arrangement of the respective walls are such as to provide the chamber with a height as measured from the floor to said outlet means, which is significantly greater than its width.

2. A device according to claim 1 which is provided with a cover having a gas escape means.

3. A device according to claim 1 which is rectangular.

4. A device according to claim 1 wherein the lower edge of the baffle is located midway between the front and back walls.

5. A device according to claim 1 wherein the lower edge of the baffle is positioned above the floor at a distance up to one and one-half times the width of the device.

6. A device according to claim 1 wherein the gas supply means extends the length of the device and in close proximity to the side of the baffle.

7. A device according to claim 1 which contains more than one baffle.

8. A device according to claim 1 which has more than one gas supply means.

9. A device according to claim 1 wherein the height of the device is at least twice the width of the device.

10. A device according to claim 9 wherein the baffle is located midway between the front and back walls, and the lower edge thereof is positioned above the floor and to a height of at most equal to one and one-half times the width of the device.

11. A device according to claim 9 which contains more than one baffle.

12. A device according to claim 9 which has more than one gas supply means.

13. A mass transfer system comprising thin channel chambers connected in sequence, through respective inlet and outlet means and connections, said chambers being designed to receive, contain and discharge liquid and each having:

i. an inlet means for providing liquid to the chamber;
ii. an outlet means for providing for the discharge of the liquid and which establishes a normal liquid level in the chamber;
iii. an least one substantially solid baffle disposed so as to separate and extend substantially parallel with at least one of the front and back walls, and contacting the side walls, the upper edge of the baffle being below said normal liquid level and the lower edge of the baffle being positioned so as to be located at some height above the floor level; and
iv. at least one means for providing gas to the chamber and which means extend substantially the length of the chamber and is located out of the vertical plane of the baffle and on the side of the baffle which is farthest from the inlet means at a position ranging from a height of one-half the distance from the lower edge of the baffle from the floor of the chamber to a height of about twice the distance of the lower edge of the baffle from the floor of the chamber;

the chamber further characterized in that the arrangement of the respective walls are such to provide the chamber with a height as measured from the floor to said outlet means, which is significantly greater than its width.

14. A mass transfer system according to claim 13 wherein the height of the individual chambers is at least twice the width of the respective chambers.

15. A mass transfer system according to claim 13 wherein the respective baffles of the individual chambers are located midway between the respective forward and back walls, and the lower edges of the respective baffles are positioned above the floor and to a height of at most equal to one and one-half times the width of the respective chamber.

16. A mass transfer system in accordance with claim 13 wherein the individual chambers are connected by the sharing of the respective common walls.

17. A mass transfer device according to claim 13 wherein the respective chambers contain more than one baffle.

18. A mass transfer device according to claim 13 wherein the respective chambers contain more than one gas supply means.

19. A mass transfer device according to claim 13 wherein the respective chambers contain more than one baffle and more than one gas supply means.

* * * * *